United States Patent [19]

Kim

[11] Patent Number: 5,676,116
[45] Date of Patent: Oct. 14, 1997

[54] VAPOR PRESSURE CONTROL SYSTEM

[75] Inventor: Wan-tae Kim, Seoul, Rep. of Korea

[73] Assignee: Kia Motors Corporation, Seoul, Rep. of Korea

[21] Appl. No.: 705,342

[22] Filed: Aug. 29, 1996

[30] Foreign Application Priority Data

Jul. 9, 1996 [KR] Rep. of Korea ............... 96-27633

[51] Int. Cl.[6] ............................................. F02M 33/02
[52] U.S. Cl. ................................... 123/518; 137/587
[58] Field of Search ............................. 123/516, 518, 123/519, 520; 137/587

[56] References Cited

U.S. PATENT DOCUMENTS

| 4,887,578 | 12/1989 | Woodcock et al. | 123/519 |
|---|---|---|---|
| 5,056,494 | 10/1991 | Kayanuma | 123/519 |
| 5,123,459 | 6/1992 | Toshihiro | 137/587 |
| 5,244,022 | 9/1993 | Gimby | 137/587 |
| 5,299,545 | 4/1994 | Kurada et al. | 123/520 |
| 5,327,873 | 7/1994 | Ohuchi et al. | 123/520 |
| 5,339,788 | 8/1994 | Blumenstock | 123/520 |
| 5,388,611 | 2/1995 | Harris | 123/519 |
| 5,456,237 | 10/1995 | Yamazaki | 123/520 |
| 5,477,836 | 12/1995 | Hyodo et al. | 123/519 |
| 5,497,800 | 3/1996 | Ohashi et al. | 123/519 |

*Primary Examiner*—Thomas N. Moulis
*Attorney, Agent, or Firm*—Van Cott, Bagley, Cornwall & McCarthy

[57] ABSTRACT

The present invention relates to a vapor pressure control system which include a canister containing activated carbon therein, a tank pressure sensor connected to a fuel tank to sense internal vapor pressure of the fuel tank, a control valve mounted in a path from the fuel tank to the canister to control the internal vapor pressure of the fuel tank, and a cut valve mounted below a filler cap to lead the vapor flowing backward from the fuel tank to the canister, so that vehicles can have vapor stability and reduce air pollution.

9 Claims, 1 Drawing Sheet

VAPOR PRESSURE CONTROL SYSTEM

[FIELD OF THE INVENTION]

This invention relates to a vapor pressure control system which can automatically prevent gasoline vapor in a fuel tank from being evaporated into the air, by means of a tank pressure valve and a cut valve, reducing air pollution and satisfying environmental regulations which limit the amount of the evaporated gas.

[DESCRIPTION OF THE PRIOR ART]

Generally, a gasoline vapor control means is adopted in an automobile to lead gasoline vapor in a fuel tank to a combustion chamber, since the air pollution may be caused by the gasoline vapor exhausted to the air, without the combustion chamber.

The gasoline vapor control means comprises a charcoal canister, in which evaporated gas is adsorbed on activated carbon to be stored, and transferred to a carburetor with the ambient air. The canister is located between the fuel tank and the combustion chamber.

The conventional gasoline vapor control means is illustrated in FIG. 1. Referring to FIG. 1, a canister 10 includes at its one end part an inlet 11 through which the gasoline vapor enters the canister, and an outlet 12 through which the vapor goes out to the combustion n chamber. The canister 10 also includes an air inlet 13 at the other end part, through which the air enters into the canister 10. The canister 10 includes the activated carbon therein for adsorption of the evaporated gas, and the vapor exhausted from the canister 10 is transferred to the combustion chamber via a catch tank 5 and a purge solenoid control valve 6.

The catch tank 5 gathers the evaporated gas from the canister 10, and supplies the vapor to the combustion chamber as much as needed in the chamber. The purge solenoid control valve 6 is open and shut by the ECU 60, controlling the supply of evaporated gas to the combustion chamber.

A fuel tank 1 is provided with an on-board refueling vapor recovery (ORVR) valve 2 and a vapor valve 3 which transfer the evaporated gas to the canister 10 via a T-joint valve 4. The ORVR valve 2 is installed in a so-called fuel line of the fuel tank 1, being closed when fuel fills the tank up to the fuel line and being kept open usually. The vapor valve 3 is an auxiliary valve for exhausting the evaporated gas and provided with orifices having a diameter of 0.7 to 2.0 mm. In general, the ORVR valve 2 has larger inner diameter than the vapor valve 3, and functions as a main path for the exhaust of gas.

The above conventional gasoline vapor control means has a disadvantage that since the evaporated gas is exhausted through the ORVR valve and the vapor valve even when the vapor pressure in the fuel tank is higher than the pressure regulated by environmental laws, there is no substantial controlling means of the vapor pressure. Further, the above conventional control means cannot control the vapor which flows backward to a filler cap, and accordingly cannot transfer the back current of the vapor to the canister.

[SUMMARY OF THE INVENTION]

It is, therefore, an object of the present invention to provide a vapor pressure control system whereby the vapor pressure in a fuel tank can be controlled below a predetermined vapor pressure.

It is another object of the present invention to provide a vapor pressure control system which can satisfy related environmental regulations limiting the vapor pressure, such as the Enhanced Vapor Regulation for U.S.A. and the ORVR (On-Board Refueling Vapor Recovery) regulations.

It is still another object of the present invention to provide a vapor pressure control system which controls the vapor flowing backward to a filler cap, improving its controlling ability.

A vapor pressure control system according to the present invention comprises a canister containing activated carbon therein, a tank pressure sensor connected to a fuel tank to sense the internal vapor pressure of the fuel tank, a control valve mounted in a path from the fuel tank to the canister to control the internal vapor pressure of the fuel tank, and a cut valve mounted below a filler cap to lead the vapor flowing backward from the fuel tank to the canister.

According to the present invention, the stability of the vapor pressure in the fuel tanks of vehicles is guaranteed, and vehicles can meet the requirements of the evaporated gas, thereby increasing the market value of the vehicles.

[BRIEF DESCRIPTION OF THE DRAWINGS]

A better understanding of the present invention may be obtained from a consideration of the detailed description hereinafter taken in conjunction with the drawings which are briefly described below, in which.

[Detailed Description of the Preferred Embodiment]

The present invention is now described in more detail with reference to the accompanying drawings.

Figure 1:
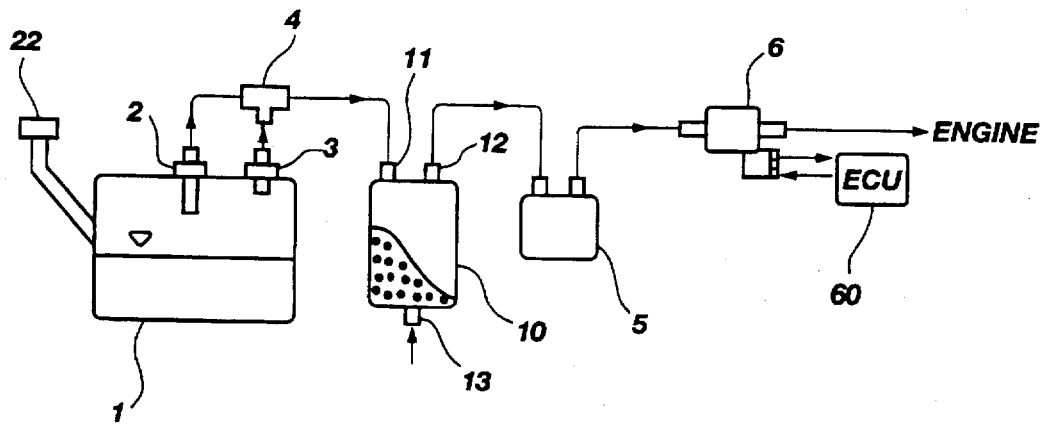
FIG. 1 is a schematic view showing a conventional gasoline vapor control system.
Figure 2:
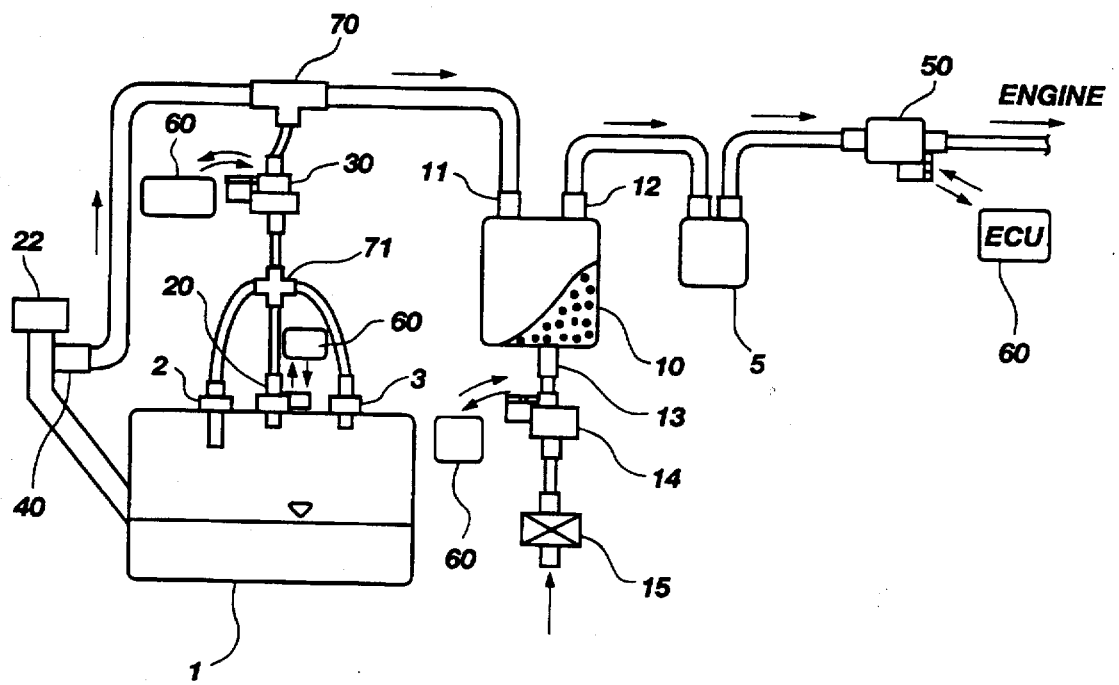
FIG. 2 is a schematic view showing a vapor pressure control system according to the present invention.

In FIG. 2, a canister 10 includes at its one end part an inlet 11 through which evaporated gas in a fuel tank 1 enters, and an outlet 12 through which the evaporated gas is transferred to an engine via a purge valve 50 controlled by an electronic control unit (ECU) 60. The canister 10 also includes an air inlet 13 at its bottom part, through which air is taken in. The canister 10 contains activated carbon therein for adsorption of the evaporated gas.

When a vehicle is stopped, the transferred vapor from the fuel tank 1 is stored in the canister 10 as adsorbed on the activated carbon, since the inhalation power from the engine is not applied to the canister 10.

To the contrary, while driving, the transferred vapor from the fuel tank 1 is supplied to the engine through the canister 10 and the purge solenoid control valve 50 to be burnt in the engine, since the inhalation power from the engine is applied to the canister 10. The purge solenoid control valve 50 is open and shut by the ECU 60, controlling the supply of the evaporated gas to the combustion chamber.

Meanwhile, a tank pressure sensor 20 is connected to the fuel tank 1 for sensing the internal pressure of the fuel tank 1. The sensor 20 is communicated with an ORVR valve 2 and a vapor valve 3 by a cross shaded joint 71. The pressure sensor 20 outputs signals representing the internal vapor pressure of the fuel tank 1 to the ECU 60.

One end of the cross shaped joint 71 is connected with a control valve 30, of which the pressure is set to be higher than a predetermined vapor pressure of the fuel tank 1, e.g., atmospheric pressure. When the internal pressure in the fuel tank 1 is lower than the predetermined pressure, the pressure sensor 20 transmits a signal to the ECU 60, which controls the control valve 30 to be closed. Further, when the internal pressure is higher than the predetermined pressure and lower than a predetermined pressure limit, the control valve 30 is controlled to be open by the ECU 60. The above pressure limit is regulated by the related environmental laws.

According to the present invention, a cut valve 40 is provided below a filler cap 22 and connected to the canister 10 via a T-shaped joint 70, so that the cut valve 40 leads the vapor flowing reversely from the fuel tank 1 to the canister 10. The cut valve 40 is also connected to the control valve 30 via the T-shaped joint 70.

The air inlet 13 of the canister 10 is connected with a close valve 14 which is connected with an air filter 15. The close valve 14 controls the flow of the air in such a way that the close valve 14 is opened for the air to be introduced into the canister 10 in usual states, and closed to check the leakage of the fuel gas in case of on-board diagnosis (OBD) monitoring.

According to the present invention, vehicles can have vapor stability and can reduce air pollution, so that they meet the requirements of the regulations for the amount of the evaporated gas, thus market value being increased.

Those skilled in the art will appreciate that the foregoing description of the preferred embodiment of the present invention is illustrative only, and that various changes and modifications in the invention as defined by the appended claims may be made without departing from the spirit and scope of the invention.

What is claimed is:

1. A vapor pressure control system comprising:
   a canister containing activated carbon, said canister having an inlet to which a first vapor conduit is connected and through which said canister may receive vapor, and said canister having an outlet through which said canister may release vapor;
   a joint in communication with said first vapor conduit, said joint having a first and a second inlet through which said joint may receive vapor, and said joint having an outlet that is in vapor communication with said first vapor conduit;
   a second vapor conduit in communication with said joint first inlet, and in communication with a cut valve so that vapor may travel from said cut valve to said joint, said cut valve being in communication with a fuel filler inlet in order to receive vapor therefrom;
   a fuel tank capable of containing fuel therein which would establish a fuel level within said fuel tank, and said fuel tank having a fuel inlet that is in communication with said fuel filler inlet so that fuel may be placed into said fuel tank through said fuel filler inlet;
   a fuel tank pressure sensor located to monitor vapor pressure in said fuel tank;
   a first valve located on said fuel tank, said first valve being capable of closing when said fuel tank is full;
   a second valve located on said fuel tank, said second valve being capable of allowing vapor to exit said fuel tank when said fuel level is between said first valve and said second valve, wherein said first and second valves are in communication with a control valve through a third vapor conduit; and
   an electronic control unit which utilizes a signal from said fuel tank pressure sensor to determine when to open and shut said control, wherein said control valve is in communication with said second inlet of said joint in order to permit communication of vapor from said fuel tank to said canister.

2. A vapor pressure control system as claimed in claim 1, said first valve is an on-board refueling vapor recovery (ORVR) valve.

3. A vapor pressure control system as claimed in claim 1, said second valve is a vapor valve.

4. A vapor pressure control system as claimed in claim 1, said cut valve being capable of allowing vapor flow from said fuel filler inlet to said canister but said cut valve preventing vapor flow from said canister to said fuel filler inlet, thereby preventing vapor from traveling from said canister to said fuel tank.

5. A vapor pressure control system as claimed in claim 1, said first valve and said second valve being jointly controlled by said control valve in order to regulate vapor communication with said canister.

6. A vapor pressure control system as claimed in claim 1, the output of said cut valve and output from said first and second valves being combined to enter said canister as a single vapor source.

7. A vapor pressure control system as claimed in claim 1, said fuel tank pressure sensor electrically communicating internal vapor pressure of said fuel tank to said electronic control unit.

8. A vapor pressure control system as claimed in claim 1, said control valve opening when vapor pressure in said fuel tank is higher than a predetermined value and closing when the vapor pressure in said fuel tank is close to atmospheric pressure.

9. A vapor pressure control system as claimed in claim 1, said canister further comprising:
   an air inlet;
   a close valve for controlling air flow to said air inlet, wherein said close valve is electrically controlled by an electronic control unit; and
   an air filter in communication with said close valve, and being positioned to filter air prior to the air travelling to the canister.

* * * * *